United States Patent
Arling

(10) Patent No.: US 12,149,761 B2
(45) Date of Patent: *Nov. 19, 2024

(54) SYSTEMS AND METHODS FOR CONTROLLING DEVICE CONFIGURATION IN A NETWORKED ENVIRONMENT

(71) Applicant: Universal Electronics Inc., Scottsdale, AZ (US)

(72) Inventor: Paul D. Arling, Scottsdale, AZ (US)

(73) Assignee: UNIVERSAL ELECTRONICS INC., Scottsdale, AZ (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/868,506

(22) Filed: Jul. 19, 2022

(65) Prior Publication Data
US 2022/0353559 A1    Nov. 3, 2022

Related U.S. Application Data

(63) Continuation of application No. 17/149,900, filed on Jan. 15, 2021, now Pat. No. 11,457,260.

(51) Int. Cl.
| | | |
|---|---|---|
| *H04N 21/81* | (2011.01) | |
| *H04N 21/241* | (2011.01) | |
| *H04N 21/422* | (2011.01) | |
| *H04N 21/441* | (2011.01) | |
| *H04N 21/443* | (2011.01) | |

(52) U.S. Cl.
CPC ..... *H04N 21/241* (2013.01); *H04N 21/42204* (2013.01); *H04N 21/4222* (2013.01); *H04N 21/441* (2013.01); *H04N 21/443* (2013.01); *H04N 21/8186* (2013.01)

(58) Field of Classification Search
CPC ............... H04N 21/241; H04N 21/443; H04N 21/8186; H04N 21/441; H04N 21/4222; H04N 21/42204
See application file for complete search history.

(56) References Cited

U.S. PATENT DOCUMENTS

| | | |
|---|---|---|
| 7,042,366 B1 | 5/2006 | Mui et al. |
| 7,136,709 B2 | 11/2006 | Arling et al. |
| 8,031,270 B1 | 10/2011 | Wisniewski et al. |
| 2010/0052870 A1 | 3/2010 | King |
| 2010/0123834 A1 | 5/2010 | Brodersen |
| 2010/0223549 A1 | 9/2010 | Edwards |

(Continued)

OTHER PUBLICATIONS

Extended European Search Report from application No. 22740035.5, dated Mar. 15, 2024, 11 pp.

(Continued)

*Primary Examiner* — Pinkal R Chokshi
(74) *Attorney, Agent, or Firm* — Greenberg Traurig, LLP

(57) ABSTRACT

A system and method uses a first device fingerprint for a set-top box (STB) installed within a home theater environment which includes an over-the-top (OTT) device to cause a one a plurality of original equipment manufacturer (OEM) remote control setup procedures to be selected for use to configure an OEM remote control for the STB and the selected one of the plurality of OEM remote control setup procedures uses a second device fingerprint for the OTT device to cause the OEM remote control to be configured to transmit one or more commands to control functional operations of the OTT device.

23 Claims, 6 Drawing Sheets

(56) References Cited

U.S. PATENT DOCUMENTS

| | | |
|---|---|---|
| 2011/0191516 A1 | 8/2011 | Xiong |
| 2013/0132094 A1* | 5/2013 | Lim ...................... G08C 17/00 |
| | | 704/E11.001 |
| 2013/0258207 A1 | 10/2013 | Kim |
| 2014/0055675 A1 | 2/2014 | An et al. |
| 2014/0222862 A1* | 8/2014 | Arling ................... G08C 17/02 |
| | | 707/769 |
| 2016/0070362 A1 | 3/2016 | Silver et al. |
| 2017/0195611 A1 | 7/2017 | Yoon et al. |
| 2017/0223109 A1* | 8/2017 | Shoemake ............ H04W 76/10 |
| 2018/0253954 A1 | 9/2018 | Verma |
| 2019/0019504 A1* | 1/2019 | Hatambeiki ............ G06F 3/165 |
| 2020/0259887 A1 | 8/2020 | Hatambeiki |
| 2021/0011609 A1 | 1/2021 | Zhang |

OTHER PUBLICATIONS

ISA/US, Int. Search Report and Written Opinion issued on PCT application No. PCT/US22/12250, dated Feb. 4, 2022, 10 pages.

\* cited by examiner

SYSTEMS AND METHODS FOR CONTROLLING DEVICE CONFIGURATION IN A NETWORKED ENVIRONMENT

RELATED APPLICATION INFORMATION

The subject application claims the benefit of U.S. application Ser. No. 17/149,900, filed on Jan. 15, 2021, the disclosure of which is incorporated herein by reference in its entirety.

BACKGROUND

U.S. Pat. No. 7,136,709 describes a system that includes one or more wireless remote controls, a plurality of devices (including network enabled devices and traditional legacy devices), associated control centric devices, and associated content centric devices. Various methods for control and operation of devices in the networked home control and automation environment are also described. Specifically, methods are described which enable advanced home control features such as location-based control setup and operation, network enabled legacy devices and system integration, save and recall capabilities for device and media states, generic command-based device controls, dynamic/complex macro command generation, and Internet based control capabilities from remote locations.

U.S. Pat. No. 7,042,366 describes a system and method in which remote controls sold with various audio-video equipment, such as televisions, audio amplifiers, tape players and disc players, are used to control other types of devices, such as toys and home devices. In order to accommodate different brands of remote controls that emit infra-red control signals according to different protocols, the controlled device that is not audio-video equipment includes a universal decoder that recognizes and decodes a variety of such signals. In a preferred embodiment, the same control function that is specified for one or more keys of a remote control is carried out in the controlled device. As examples, a sound source in the controlled device is muted when a mute button of any one of many different brands of remote controls is pushed, and/or the volume of the sound source is increased and decreased when volume-up and volume-down buttons, respectively, are pushed. When a television, or other piece of audio-video equipment, and a toy or home device, or other type of device that emits sounds, are both within range of the audio-video equipment remote control, the sound of both is controlled at the same time.

U.S. Publication No. 2016/0070362 describes an adaptive interface device that is programmable and a system and method of programming the adaptive interface device. To program the adaptive interface device, a user navigates navigable data structure stored on the adaptive interface device through certain combinations of user inputs using the programmable inputs. The adaptive interface device outputs navigation codes indicative of the user's navigation of the navigable data structure. A connected computer receives and interprets the navigation codes and provides visual feedback to a user to assist in programming. More particularly, a web browser of the connected computer receives the navigation codes and provides the user with a graphical representation of the navigable data structure and the user's navigation thereof.

U.S. Publication No. 2010/0223549 describes a method for controlling an electronic device, the method including but not limited to electronically identifying a first remote control device for a first electronic device at a multimedia processor end user device; accessing specification data for the first remote control device for determining functions available on the first remote control device; displaying an image of a second remote control on the display for the multimedia processor end user device; mapping a set of remote control functions available on the first remote control device to a set of function keys on the second remote control display; and highlighting a function key on the image of the second remote control to which a function performed by a selected function key on the first remote control is mapped. A system and computer program product for performing the method are also described.

While these example systems and methods generally work for their intended purpose, a need exists for a system and method for configuring a controlling device in a networked environment that is simpler to use and which results in an improved user experience.

SUMMARY

In accordance with these needs and desires, example systems and methods for controlling device configuration in a networked environment are hereinafter described.

In one example, a system and method uses a first device fingerprint for a set-top box (STB) installed within a home theater environment which includes an over-the-top (OTT) device to cause a one a plurality of original equipment manufacturer (OEM) remote control setup procedures to be selected for use to configure an OEM remote control for the STB and the selected one of the plurality of OEM remote control setup procedures uses a second device fingerprint for the OTT device to cause the OEM remote control for the STB to be configured to transmit one or more commands to control functional operations of the OTT device.

In one example, the selected one of the plurality of OEM remote control setup procedures functions to invoke a corresponding remote control setup procedure installed on the OEM remote control and the second device fingerprint is provided directly to the OEM remote control for use by the setup procedure installed on the OEM remote control whereupon the setup procedure installed on the OEM remote control will use the second fingerprint to cause the OEM remote control to be configured to transmit one or more commands to control functional operations of the OTT device.

In one example, the OTT device uses the first device fingerprint to configure itself to use a communications channel and a protocol by which the OTT device can communicate at least the second device fingerprint to the OEM remote control.

In one example, the selected one of the plurality of OEM remote control setup procedures functions to invoke a setup procedure installed on the STB and the second device fingerprint is provided directly to the STB for use by the setup procedure installed on the STB whereupon the setup procedure installed on the STB will use the second device fingerprint to cause the OEM remote control to be configured to transmit one or more commands to control functional operations of the OTT device.

In one example, the OTT device uses the first device fingerprint to configure itself to use a communications channel and a protocol by which the OTT device can communicate at least the second device fingerprint to the STB.

In one example, the plurality of OEM remote control setup procedures is stored in a memory of the OTT device."

In one example, the plurality of OEM remote control setup procedures is stored in a database associated with a remote/cloud-based server associated with the OTT device.

In one example, the selected one of the plurality of OEM remote control setup procedures will use the second device fingerprint to identify and cause to be provided to the OEM remote control for use by a setup procedure installed on the OEM remote control data indicative of one or more commands and a communications protocol recognizable by the OTT device whereupon the setup procedure installed on the OEM remote control will use the provided data to cause the OEM remote control to be configured to transmit one or more commands to control functional operations of the OTT device.

In one example, the selected one of the plurality of OEM remote control setup procedures will use the second device fingerprint to identify and cause to be provided to the OEM remote control for use by a setup procedure installed on the STB data indicative of one or more commands and a communications protocol recognizable by the OTT device whereupon the setup procedure installed on the STB will use the provided data to cause the OEM remote control to be configured to transmit one or more commands to control functional operations of the OTT device.

In one example, an OTT device uses a first device fingerprint for a STB device installed within a home theater environment which includes the OTT device to cause a one a plurality of OEM remote control setup code lookup tables to be selected for use to configure an OEM remote control for the STB and uses a second device fingerprint for the OTT device to identify a setup code within the selected one of the plurality of OEM remote control setup code lookup tables whereupon the identified setup code, when provided to a remote control setup procedure installed on the OEM remote control, will cause the OEM remote control to be configured to transmit one or more commands to control functional operations of the OTT device.

In one example, an OTT device uses a first device fingerprint for a STB installed within a home theater environment which includes the OTT device to cause a one a plurality of OEM remote control setup code lookup tables to be selected for use to configure an OEM remote control for the STB and uses a second device fingerprint for the OTT device to identify a setup code within the selected one of the plurality of OEM remote control setup code lookup tables whereupon the identified setup code, when provided to a setup procedure installed on a server device, will cause the server device to identify at least a command codeset to be provisioned to the OEM remote control to configure the OEM remote control to transmit one or more commands to control functional operations of the OTT device.

A better understanding of the objects, advantages, features, properties and relationships of these and additional systems and methods will be obtained from the following detailed description and accompanying drawings which set forth illustrative embodiments.

BRIEF DESCRIPTION OF THE DRAWINGS

For a better understanding of the systems and methods described hereinafter, reference may be had to preferred examples shown in the following drawings in which.

DETAILED DESCRIPTION

With reference to the figures, example systems and methods for controlling device configuration in a networked environment are hereinafter described. In this regard, a controlling device is to be considered as any device having the capability to control operations of another device within a system. Generally, the described systems and methods provide a means to simply configure: a) an original equipment manufacturer (OEM), set-top box (STB) remote control (i.e., a remote control provided with a STB that is used to access media originating from a cable/satellite service provider, such as "COMCAST," "DISH," "DIRECT TV," and the like) whereupon the OEM STB remote control is usable to control functional operations of an over-the-top (OTT) media access device (i.e., a device used to access streaming media services, such as "NVIDIA SHIELD TV," "MINIX NEO U9-H," "KINGBOX K3," "ROKU ULTA," "APPLE TV," and the like); b) an OTT device to recognize and act upon communications received from an OEM STB remote control (including, in some instances, to control still further devices with the OTT device acting as a controlling, bridge device); and/or c) an app associated with an OTT system (and/or an OEM OTT remote control) to be usable to control functional operations of a STB. In this manner, the envisaged systems and methods will provide for the interoperability of various network enabled home entertainment devices and will provide advanced command and control functions for such devices.

Figure 1:
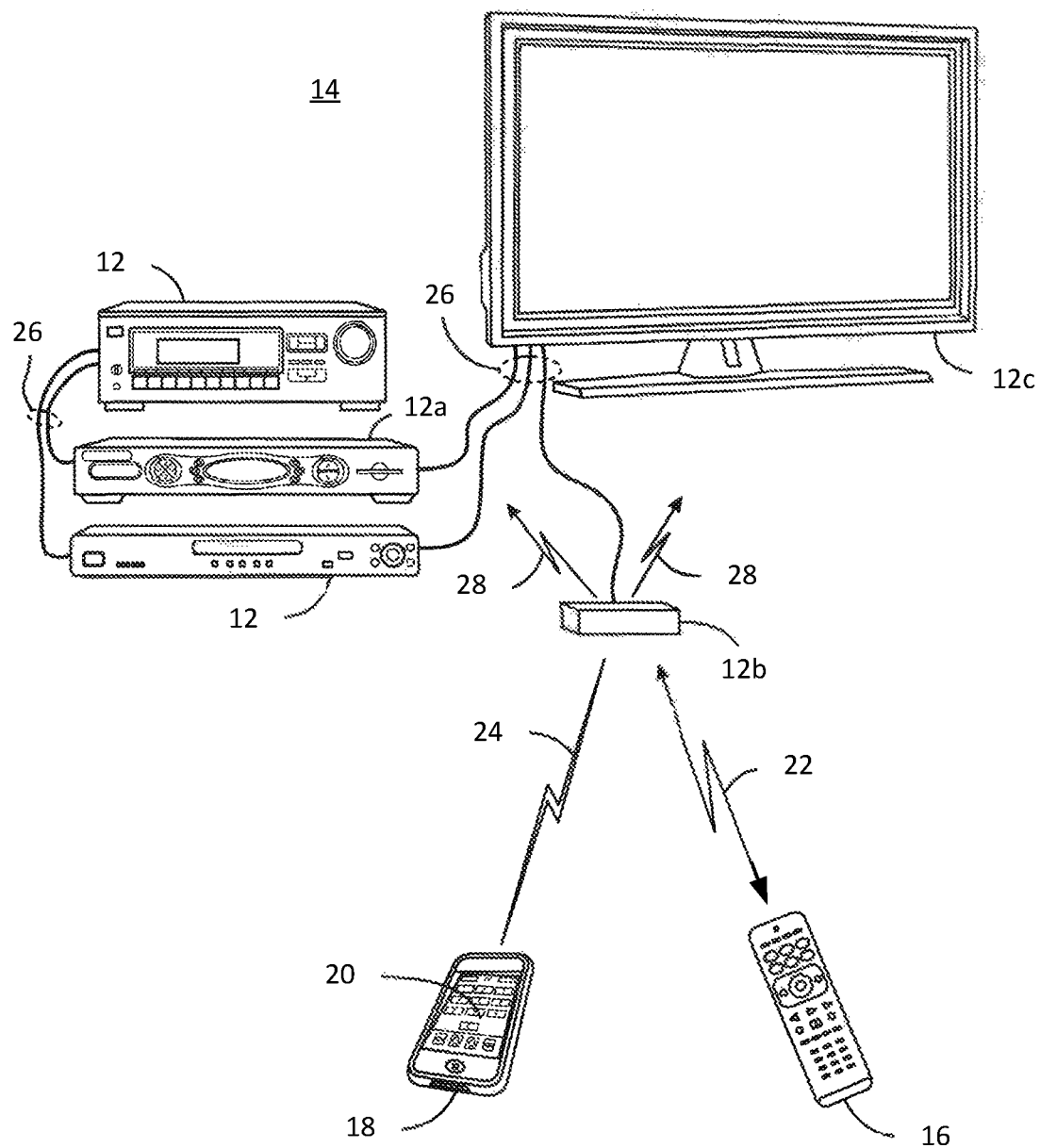
FIG. 1 illustrates devices within an example networked home control and automation system.

Turning to FIG. 1, a plurality of devices 12, including a STB 12a, an OTT device 12b, and a television (TV) 12c, form at least a part of a home entertainment system 14 in which the methods hereinafter described may be practiced. The home entertainment system 14 additionally includes an OEM remote control 16 (i.e., a remote control provided with/designed specifically for use with the branded STB 12a) and/or a smart device 18 hosting an app 20 that is associated with/designed to be used with the OTT device 12b. The remote control 16 and/or the smart device 18 (via app 20) are intended to receive user input, e.g., via key activations, motions, and/or voice, for at least initiating a performance of a functional operation by one or more of the devices 12 within the system 14. In a common functional operation, one or more of the devices 12—such as OTT device 12b—is caused to be placed into a state for accessing and causing media content to be rendered for viewing by a user in response to a user interaction with a one of these controlling devices 16/18.

As will be appreciated by those of skill in the art, the STB 12a associated with each of the various cable service providers (and/or an associated, remote server) may be provided with a remote control setup procedure that is cooperable with a corresponding remote control setup procedure installed on the OEM STB remote control 16 where the cooperable remote control setup procedures are usable to, for example, configure the OEM STB remote control 16 to control functional operations of a TV 12c. Accordingly, a "DISH" STB may be provided with a first remote control setup procedure that is cooperable with a corresponding remote control setup procedure installed on a "DISH" STB remote control, a "COMCAST" STB may be provided with a second remote control setup procedure that is cooperable with a corresponding remote control setup procedure installed on a "COMCAST" STB remote control, etc. Non-limiting examples of remote control setup procedures may be found in U.S. Pat. Nos. 7,743,012; 8,558,676; 2003/0141987; 10,621,857; and 10,771,608, the disclosures of which are incorporated herein by reference in their entirety.

In addition to the STB 12a, OTT device 12b, and TV 12c, the devices 12 controllable via use of the OEM remote control 16 and/or smart device 18 may also include VCRs, DVRs, DVD players, cable converter boxes, amplifiers, CD players, game consoles, home lighting, drapery, fans, HVAC systems, thermostats, personal computers, security systems, network enabled automobiles, and the like without limitation. Furthermore, within the system 14, at least the STB 12a, OTT device 12b, and TV 12c are preferably network enabled such that basic device addressing, accessibility, monitoring, remote management, discovery, and other network communication-based features are possible in the home control and automation environment. Accordingly, at least devices 12a, 12b, and 12c will be adapted to use well known centralized networking methods, ad hoc networking methods (including peer-to-peer networking), powerline or phoneline based networking methods, or a combination of the above (whether wired or wireless) to accomplish the features and goals of the subject systems and methods. Additionally, it will be appreciated that one or more of the devices 12 and/or other components of the exemplary system 14 may incorporate some or all of the features, functions, and capabilities of other individual devices such that a minimal number of separate physical devices are required in a given home environment to accomplish the goals hereinafter described. As such it will be further appreciated that the various system elements defined and described herein should be considered as functional modules capable of implementation individually or collectively in a single physical device or a software module in a software product, or one or more elements may be implemented in separate physical devices or software modules, without departing from the scope and spirit of the subject disclosure.

As further illustrated in FIG. 1, device commands and/or data may be transmitted from OEM remote control 16 using an infrared (IR) and/or a radio frequency (RF) communications channel 20. The OEM remote control 16 is pre-configured to use a protocol and commands recognizable by the STB 12a (in at least a STB mode of remote control operation as is conventional in the art) while being configurable to use a protocol and commands recognizable by one or more other devices 12 in the system 14 if needed. In addition, the OEM remote control 16 may be itself adapted to received IR and/or RF communications from one or more other components within the system 14 via the communications channel 20, e.g., to allow the remote control 16 to receive setup data, software updates, etc. In some instances, the OEM remote control 16 may be provided with a universal receiver and/or be used as a bridge device as needed for any particular purpose.

Similarly, device commands and/or data may be transmitted by smart device 18 using an IR and/or a RF communications channel 22. The app 20 installable on the smart device 18 is pre-configured with the information and data such that, when installed on the smart device 18, the smart device 18 will use a protocol and/or commands recognizable by the OTT device 12b (or recognizable by a device—whether local or remote—that is adapted to command operations of OTT device 12b in response to communications received from smart device 18, e.g., a bridge device) to control functional operations of the OTT device 12b, in at least an OTT device mode of remote control operation within the app, as is conventional in the art, with the app likewise being configurable to use a protocol and/or commands recognizable by one or more other devices 12 in the system 14 if needed. In addition, the smart device 18 may be itself adapted to received IR and/or RF communications from one or more other components within the system 14 via the communications channel 22. Similarly, the smart device 18 may also be adapted to act as a bridge device as needed for any particular purpose.

Finally, the various devices within the system 14 (including the controlling devices 16 and 18) may be adapted to communicate commands and/or data to one another as needed via use of wired and/or wireless communications channels as needed.

The transmission of any commands and/or data to and/or from device 12, 16, and/or 18 within the system 14 may take the form of wireless IR signals, wireless RF signals, such as contemplated by "RF4CE," "ZWAVE," and "BLUETOOTH," CEC commands issued over a wired "HDMI" interface, and/or via use of any convenient wireless, wired, point-to-point, or networked protocol, as necessary for a particular embodiment. Furthermore, while communications between the devices 12, 16, and 18 within the system 14 are primarily illustrated in FIG. 1 as direct links, it is to be appreciated that in some instances such communication may take place via a local area network or personal area network, and as such may involve various intermediary devices such as routers, bridges, access points, etc. Thus, communications between (i.e., to and/or from) devices 12, 16, and 18 within the system 14 can be exchanged via use of the local area network and/or via use of a wide area network, e.g., including the Internet, as appropriate to any given need. Operation of the system 14 may utilize still further devices that provide access to various Internet/Cloud based services.

Figure 2:
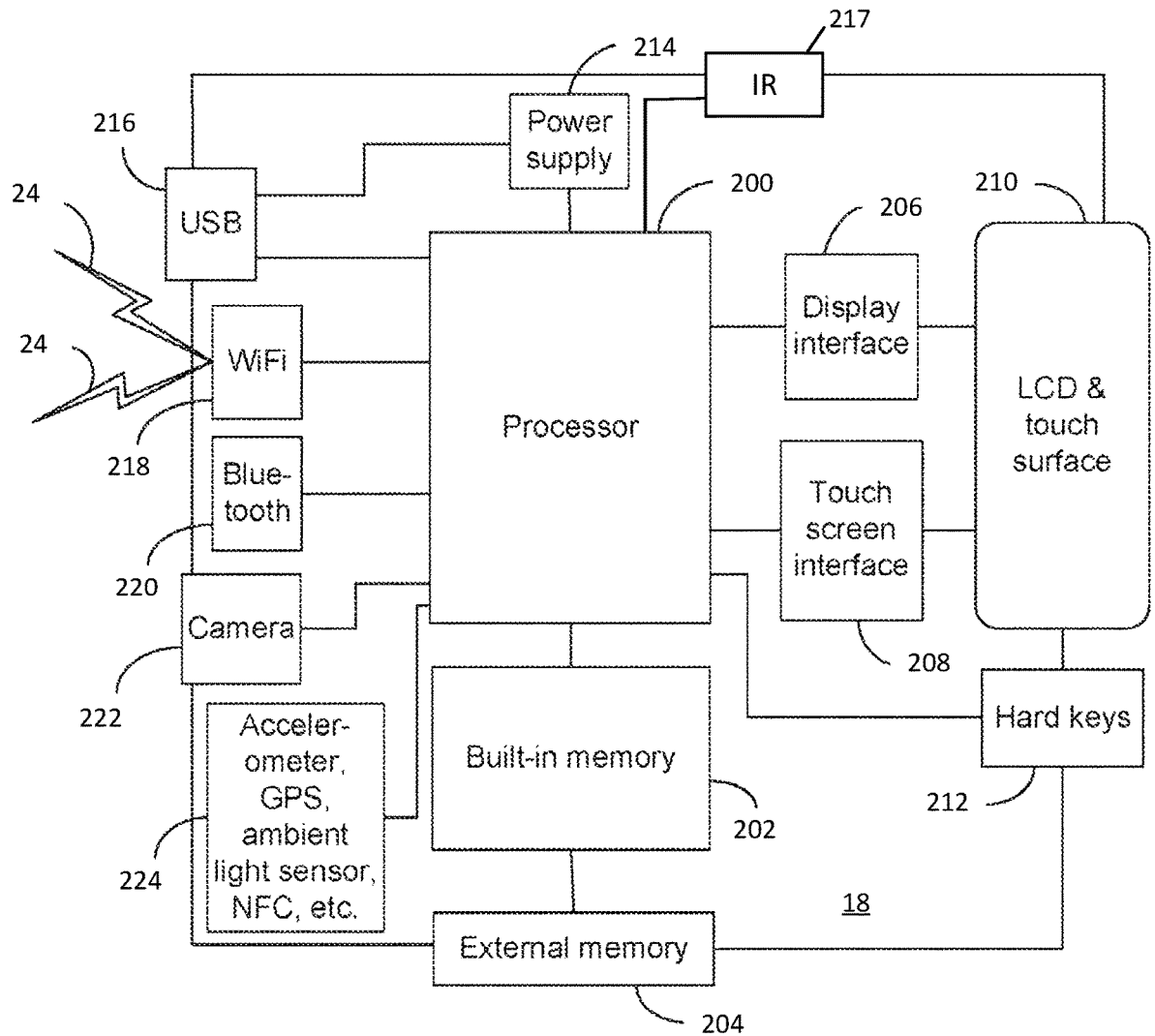
FIG. 2 illustrates in block diagram form components of an example controlling device within the system of FIG. 1.

Looking now to FIG. 2, for receiving user input and for transmitting commands and data to the devices 12 within the system 14, the smart device 18 (with the installed app 20) may include, as needed for any particular purpose, a processor 200 and memory 202, which memory may comprise a combination of ROM memory, RAM memory, and/or non-volatile read/write memory and may take the form of a chip, a hard disk, a magnetic disk, an optical disk, a memory stick, etc., or any combination thereof. In some embodiments, provision may also be made for attachment of external memory 204 which may take the form of an SD card, memory stick, or the like. Hardware provisioned as part of an exemplary platform may include a microphone, an LCD touchscreen 210 with associated display driver 206 and touch interface 208 providing soft keys; hard keys 212; a USB port 216; "IR" transceiver and interface 217; "WIFI" transceiver and interface 218; a "BLUETOOTH" transceiver and interface 220; a camera 222; and various other features 224 as appropriate for a particular embodiment, for example an accelerometer, GPS, ambient light sensor, near field communicator; etc. The electronic components comprising the device 18 may be powered by a battery-based internal power source 214, rechargeable for example via USB interface 216. The soft keys and hard keys are collectively and individually referred to herein as input elements and the input elements generally provide a user interface for use in receiving input that is intended to cause the device 18 to, among other things, transmit commands and/or data to one or more components within the system 14.

Memory 202 may include executable instructions that are intended to be executed by the processor 200 to control the operation of the device 18 and to implement various functionalities as known in the art. For example, programming comprising additional functionalities (referred to as "apps") may be downloaded into device 18 via, for example, "WIFI" interface 218, "USB" 216, external memory 204, or any other convenient method. As discussed previously, one such app may comprise a control app, for example as described in U.S. patent application Ser. No. 13/329,940 of like assignee and incorporated herein by reference in its entirety, which app may be used to command the functional operations of at least the OTT device 12b when initially provisioned to device 18 and which may be configured to command functional operations of other devices 12 within the system 14 as needed for any particular purpose.

To configure the device 18 to match the device(s) to be controlled, e.g., to use a protocol and/or command values that would be recognized by a device 12 within the system 14, the device 18 may also be provisioned with a setup agent app or remote control setup procedure, either as part of a control app or as separately downloadable app. The setup agent app may be used to provision the device 18 within command codesets for use in commanding functional operations of device(s) 12 within the system using, for example, the methods described in U.S. Publication No. 2020/0259887, the disclosure of which is incorporated herein by reference in its entirety. The setup agent functionality can therefore be provided by/supported by one or more "universal control engines" installed within the system.

It will be also understood that the remote control 16 may include some or all of the components described with respect to the smart device 18 as needed for any particular purpose.

Figure 3:
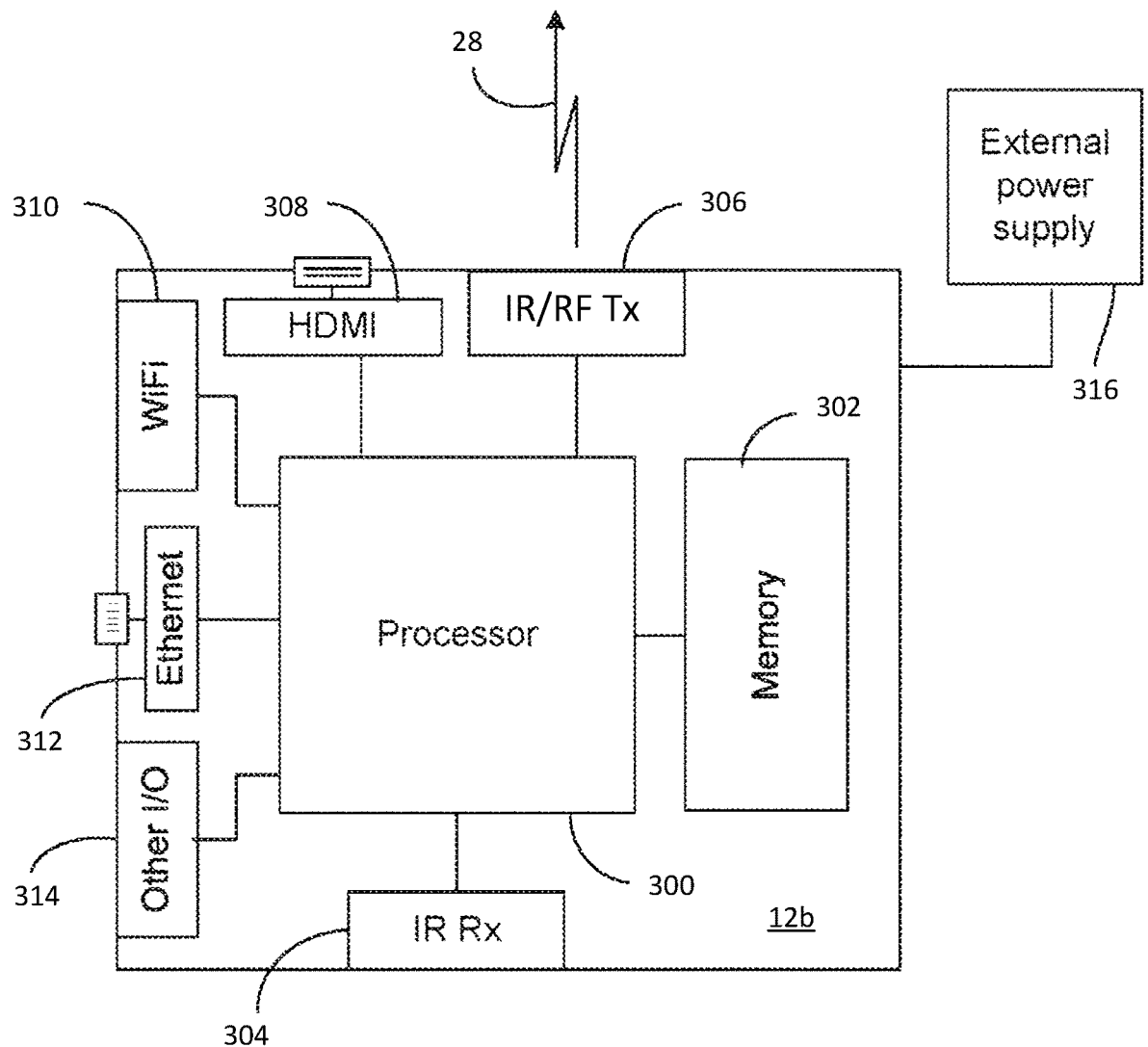
FIG. 3 illustrates in block diagram form components of an example OTT device within the system of FIG. 1.

With reference to FIG. 3, an example OTT device 12b (whether stand alone or integrated into another device, such as a TV) may include, as needed for a particular application, a processor 300 coupled to a memory 302 which memory may comprise a combination of ROM memory, RAM memory, and/or non-volatile read/write memory and may take the form of a chip, a hard disk, a magnetic disk, an optical disk, a memory stick, etc., or any combination thereof. It will also be appreciated that some or all of the illustrated memory may be physically incorporated within the same IC chip as the processor 300 (a so called "microcontroller") and, as such, the memory is shown separately in FIG. 3 only for the sake of clarity. Interface hardware provisioned as part of the example device 12b may include IR receiver circuitry 304 and IR transmitter circuitry 306; one or more microphones; an "HDMI" interface 308; one or more RF, e.g., WiFi, transceivers and interfaces 310; an Ethernet interface 312; and any other wired or wireless I/O interface(s) 314 as appropriate for a particular embodiment, by way of example and without limitation "BLUETOOTH," "RF4CE," "USB," "ZIGBEE," "ZENSYS," "X10/INSTEON," "HOMEPLUG," "HOMEPNA," etc. Communications and device discovery may also use IP interfaces, underlying technologies such as "Thread," a low-power wireless mesh networking protocol, and/or the like without limitation.

In some instances, the electronic components comprising the example OTT device 12b may be powered by an external power source 316. In the case of a standalone device 12b, such as illustrated in FIG. 1, this may comprise for example a compact AC adapter "wall wart." In other instances, e.g., where the OTT device 12b is embodied in a TV, the device 12b may draw operating power from the device into which the device 12b is integrated. It will also be appreciated that in the latter case, in certain embodiments processor 300 and/or memory 302 and/or certain portions of interface hardware items 304 through 314 may be shared with other functionalities of the host device.

As will be understood by those skilled in the art, some or all of the memory 302 may include executable instructions or procedures that are intended to be executed by the processor 300 to control the operation of the OTT device 12b (collectively, the device programming). The memory 302 may also store instructions in the form of apps, for example, to provide a means for the device 12b to stream media from an Internet media source for display on a display coupled to the OTT device 12b, such as TV 12c. Yet further, the memory 302 may also store data which serves to define the necessary control protocols and/or command values for use in transmitting command signals to controllable devices, e.g., codeset information, as needed. In this manner, the processor 300 may be programmed to control the various electronic components within the example OTT device 12b, e.g., to monitor the communication means 304, 310 for incoming request messages from controlling devices 16/18, to monitor the microphones for sound signals, to cause the transmission of device command signals, etc. As noted previously, the programming may also provide for a universal IR and/or RF command receiver, e.g., the OTT device 12b can be programmed to recognized commands transmitted using a variety of protocols and a variety of data as would be received from OEM remote controls provided with a variety of STBs of different brands and model, or the programming may provide for a command receiver that will recognize commands transmitted using a specific protocol and a specific data.

To cause the OTT device 12b to perform an action, e.g., to navigate one or more menus that the OTT device 12b is causing to be displayed on TV 12c, to commence a rendering of a streaming media, to pause the rendering of a streaming media, to commence one or more auto-configuration processes, etc., the OTT device 12b may be adapted to be responsive to events, such as a received voice signal, a received request message or command from a controlling device 16/18, changes in connected device status reported over "HDMI" interface 308, "WIFI" interface 310, or "ETHERNET" interface 312, etc. In response to an event, appropriate instructions within the device programming may be executed. For example, when a command request is received via a microphone, from a smart phone 18, or the like, the device 12b may cause a media to be streamed from an Internet media source and may cause that media to be provided to the TV 12c for display to a user. In a similar manner, the OTT device 12b may cause instructions for transmitting one or more command values using a transmission protocol using a preferred command transmission medium (e.g., IR, "RF4CE", CEC over "HDMI," IP over "WIFI,", etc.) to be retrieved from memory and executed by the processor for the purpose of transmitting control signals to an intended target device to thereby control functional operations of that device, e.g., to control the volume of the TV 12c. As needed, the status of connected devices, e.g., powered or not powered, currently selected input, playing or paused, etc., as may be discerned from interfaces 308 through 314, may be monitored and/or tabulated by the device programming in order to facilitate adjustment of controlled device settings/states, e.g., to place the controlling device into a required or desired state, to place a controlled device into a required or desired state via use of automatically transmitted control/data signals, to match user-defined activity profiles, e.g. "Watch TV", "View a movie", etc. It will also be appreciated that the command values, protocols to use when transmitting commands, etc. may be obtained from a cloud-computing service as needed or as required.

It is to be understood that the STB 12a will include some or all of the various components/elements set forth above as being included in the OTT device 12b, as needed for any particular purpose.

In some circumstances, the programming of the OTT device 12b (and/or the programming of other device(s) 12 within the system 14) will function to gather data for use in identifying one or more of the devices 12 within the system 14, e.g., the OTT device 12b may support the aforementioned "universal controlling engine" functionality. Such device identifying data (also referred to as a device fingerprint) will be available for use to configure the system 14 for the purpose of allowing commands and/or data to be exchanged between devices 12, 16, and/or 18 as desired. More particularly, as described in U.S. Publication No. 2020/0259887, a device fingerprint, which is generally indicative of a devices type and make (and sometimes model) of a device, may be used to adapt a device 12 having control capabilities, such as remote control 16, smart device 18, OTT device 12b, or the like, to transmit recognizable command codes in the format appropriate for the device 12 that corresponds to the device fingerprint, also referred to as a target device. The device fingerprint may also be used to configure the OTT device 12b to recognize command and/or data transmissions originating from an OEM remote control that is provided with a device corresponding to the device fingerprint, e.g., STB 12a, as desired for a given purpose.

As described above, a setup agent app may be provisioned to one or more devices 12 within the system 14 in order to facilitate detection, installation, and operation of apps, command codesets, and the like as needed to provide inter-device communication capabilities. In one example, the setup agent installed on a device 12 may periodically initiate a scan of its current wired and/or wireless network environment (e.g., "WIFI," "BLUETOOTH,", etc. or any combination thereof) to ascertain the presence of one or more system components, e.g., devices 12, smart device 18 and/or remote control 16 within the system 14. This action may be initiated automatically (for example based on a timer which is used to measure predetermined periods of time, in response to the device being turned on, in response to a detected change in location of the device using for example its GPS or the like type of functionality, when connecting to new networks, etc.) or may be manually initiated by a user of a device (for example in response to an activation of a user input element, in response to the device being moved, etc.) as appropriate for a particular embodiment. If it is determined that no responsive devices 12 are present in the environment, the setup agent actions are complete. If, however, one or more responsive devices are detected, e.g., a device responds with data indicative of its identity in response to a polling request message sent from a device having the setup agent, then the setup agent may next determine, using the information received, if the responsive device is already known to the setup agent, e.g., determine if the device has already been detected during a previous detection operation or otherwise manually indicated to the setup agent. Such a determination may be made, for example, by consulting a setup agent-administered listing of device identities. If the device is already known to the setup agent, processing continues to determine if further responsive devices have been detected.

If it is determined that a newly-responsive device 12 has been detected, then the setup agent may next determine if an app, command codeset, and/or other device configuration information is available for that device 12, i.e., programming and/or data that can be provided to one or more device in the system 14 to facilitate inter-device communications with (to and/or from) the newly-response device 12 and/or an OEM controlling device 16 provided with the newly-responsive device 12. Such a determination may be made, for example, by using vendor information, a third party compatibility database, or by a social network database which may contain related device information updated by other users or by searching a database that functions to cross-reference device identifying data as would be received from the devices (e.g., data indicative of a manufacturer and model number) to available configuration information and locations from which such configuration information apps may be download. The database may be stored in a local memory of the device 12 on which the setup agent is installed, may be located at a cloud-based data storage facility or server, or a combination thereof, as appropriate for a particular embodiment.

When an app and/or other configuration information is downloaded and installed, in some embodiments the setup agent may register that app and/or other downloaded and installed information with a cloud based service, by way of forwarding unique identity information regarding the installed programming and the environment (e.g., network and/or app owner information) in which it is operational to a server system where such registration information may be subsequently utilized for the purpose of synchronizing multiple instances of the same app across different Operating Systems. Similarly, the setup agent may add the current device identity or device fingerprint into a local tabulation of known devices. Such an identity may comprise a serial number, MAC address, or any other data value suitable to uniquely identify the device.

Figure 4:
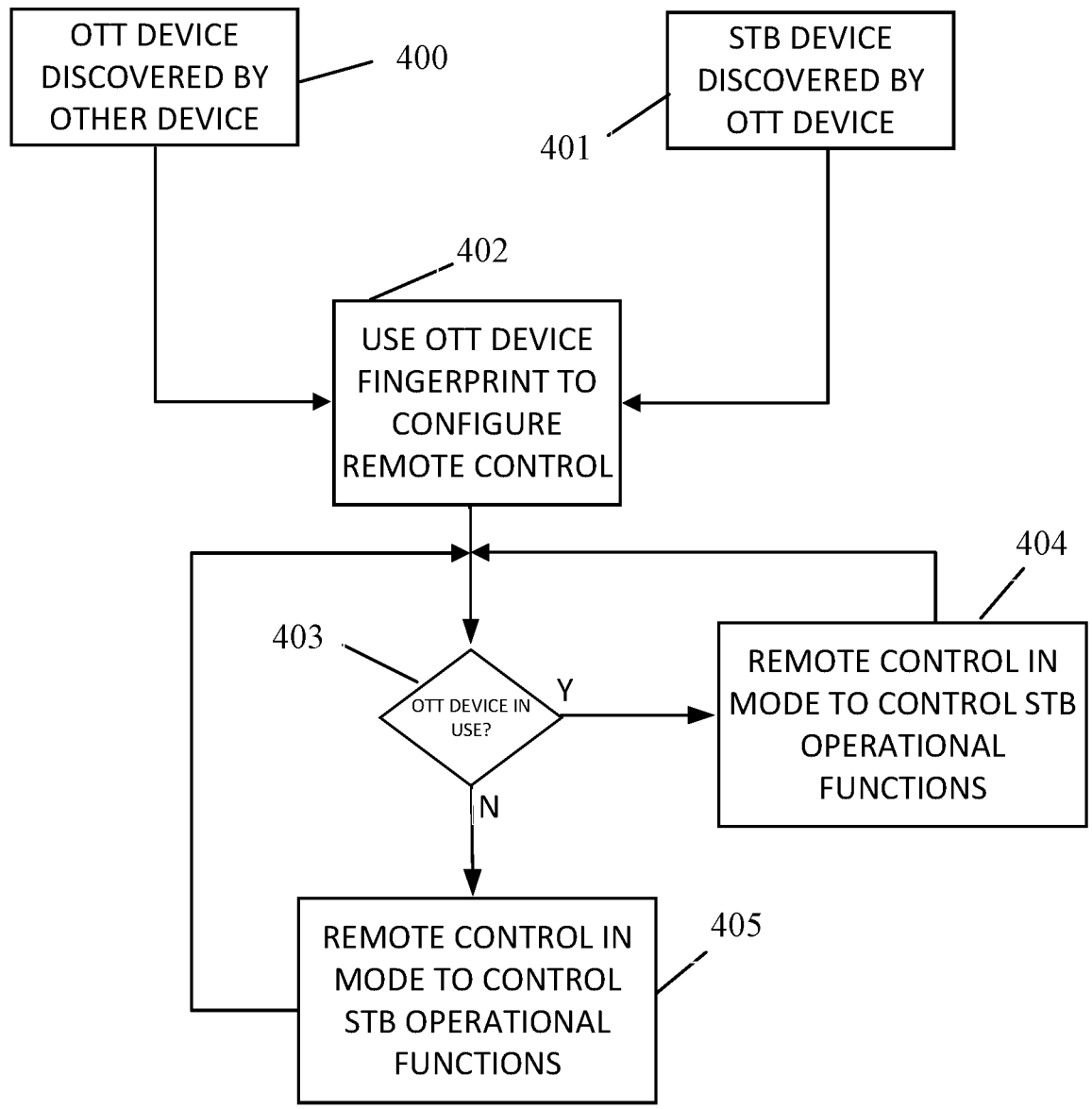
FIG. 4 illustrates example methods for configuring an OEM remote control for use with an OTT device.

In one example, such as illustrated in FIG. 4, when an OTT device 12b has been detected or installed within the system 14, a setup-up agent installed on a device 12 within the system 14, e.g., STB 12a, remote control 16, etc., may function to configure the OEM STB remote control 16 for use in controlling functional operations of the OTT device 12b. To this end, the device fingerprint information for the OTT device 12b can be provided directly to the remote control 16 whereupon the remote control 16 will initiate the process to install the command codeset appropriate for communicating commands to the OTT device 12b and to map commands from the command codeset to input elements of the remote control 16 for use in one or more operational modes of the remote control 16.

In other circumstances, the device fingerprint information for the OTT device 12b can be provided to a still further device 12 within the system, e.g., the STB 12a, and/or to a remotely located server whereupon that device will cooperate with the remote control 16 to install the command codeset appropriate for communicating commands to the OTT device 12b and to map commands from the command codeset to input elements of the remote control 16 for use in one or more operational modes of the remote control 16. In this manner, a user will be able to use a conventional STB remote control with which the user is familiar to control one or more functional operations of the OTT device 12b.

Still further, upon the OTT device 12*b* detecting that it has been newly installed within a local area network that includes a STB 12*a*, the OTT device 12*b* can provide its fingerprint information to the STB 12*a* and/or the OEM STB remote control 16 for use in an OEM STB remote control 16 configuration process. In this regard, programming installed on the OTT device 12*b* can mimic any parts of the OEM STB remote control configuration process that would otherwise normally be performed by the programming of STB 12*a* (e.g., to invoke the configuration process on the remote control 16, communicate data to the remote control 16 etc.), the OTT device 12*b* can provide required information to the STB 12*b* with a request for the STB 12*b* to initiate the OEM STB remote control configuration process, and the like as needed for any particular purpose.

By way of further example, a setup agent of the OTT device 12*b* can automatically initiate the configuring of the OEM STB remote control 16 in response to the OTT device 12*b* being introduced into the system 14 and/or upon the OTT device obtaining device fingerprint information for the STB 12*a*. The OTT device 12*b* could then use the fingerprint information for the STB 12*a* to select an appropriate one of a plurality of remote control setup procedures to invoke (e.g., the OTT device 12*a* may store remote control setup up procedures for use in configuring each of a "COMCAST" remote control, a "DIRECT TV" remote control, etc.), determine that the corresponding OEM STB remote control 16 is present within the system 14, and, in response to determining that the OEM STB remote control 16 is present within the system, select an appropriate communication protocol/channel for interacting with the remote configuration process as resident on the remote control 16 and cause the OEM STB remote control 16 to be provided with data—such as the OTT device fingerprint, a command codeset, and/or the like—as needed by the OEM STB remote control 16 for the OEM STB remote control 16 to be configured to control functional operations of the OTT device 12*b* as described above.

For determining that the OEM STB remote control 16 is within the system 14, the OTT device 12 can look for a remote control device fingerprint which corresponds to the device fingerprint of the STB 12*a*. In some instances, the setup agent app can receive information about the device(s) 12 the remote control 16 is already configured to control and can use that information to identify the existence of the remote control 16 within the system 14.

It will also be appreciated that some of the steps set forth above for configuring the OEM STB remote control 16 may be performed by the STB 12*a* under the direction of the OTT device 12*b*.

In some circumstances, the STB 12*a*, the OTT device 12*b*, and/or the TV 12*c* can communicate state information to the remote control 16 to thereby allow the remote control 16 to select a current operating mode for the remote control 16. For example, one or more of the STB 12*a*, OTT device 12*b*, and the TV 12*c* can determine that the OTT device 12*b* is currently being used by the user to watch media on the TV 12*c*. This state information (obtained, for example, by monitoring the HDMI ports of the relevant devices 12 or the like) can be conveyed to the remote control 16 whereupon the remote control 16 can automatically place itself into an operating mode for controlling functional operations of the OTT device 12*b*. In such an operational state, commands, such as menu/navigational commands that would normally be transmitted to the STB 12*a* with which the remote control 16 is provided in response to key activations, will be replaced with commands that are intended to be received by the OTT device 12*b*, i.e., commands from the OTT device 12*b* command codeset will be mapped to select input elements of the remote control 16 when the remote control is placed in the selected operating mode.

When the remote control is subsequently informed that the OTT device 12*b* is no-longer being used to view media, e.g., one or more of the STB 12*a*, OTT device 12*b*, and the TV 12*c* determine (and inform the remote control 16) that the STB 12*a* is currently being used by the user to watch media on the TV 12*c*. the OTT device 12*b* has been turned off, etc., the remote control 16 can automatically revert to the operational state in which the remote control 16 will transmit commands to the STB 12*a* (as opposed to the OTT device 12*b*) in response to activations of corresponding input elements of the remote control 16.

It is also contemplated that the OTT device 12*b* can use the device fingerprint for the STB device 12*a* and its own identify to determine a setup code that would need to be provided to the OEM remote control device 16 to configure the OEM remote control device 16 to transmit commands to control functional operations of the OTT device 12*b*. The code, once identified, can be automatically provided to a setup application executing on the remote control device 16 (or to the STB 12*a* capable of communicating with the remote control device 16) whereupon the setup application will use the provided code to configure the remote control device 16 with the command codeset (including any protocol information as needed) recognizable by the OTT device 12*b*. The OTT device 12*b* can also cause the setup code to be displayed to a user via use of a display device, e.g., TV 12*c*, where the user can manually provide the setup code to the setup application executing on the remote control device 16.

By way of further example, in the above setup methodology the OTT device can: a) recognize from the device fingerprint that the STB in the system 14 is a "COMCAST" branded STb; b) identify within a code lookup table for the "COMCAST" branded OEM STB remote control that the setup code for configuring a "COMCAST" OEM STB remote control 16 to communicate commands to a "ROKU ULTA," which the OTT device 12*b* knows itself to be, is "0145;" and c) cause that identified setup code to be displayed for manual entry into a remote control setup app (with appropriate instructions as needed) or provided, e.g., via a transmission, for use by a remote control setup app installed on the remote control 16, the STB 12*a*, and/or the like. Similarly, the OTT device can: a) recognize from the device fingerprint that the STB is a "CHARTER" branded STB; b) identify within a code lookup table for the "CHARTER" branded OEM STB remote control that the setup code for configuring a "CHARTER" OEM STB remote control 16 to communicate commands to a "ROKU ULTA," which the OTT device 12*b* knows itself to be, is "5167;" and c) cause that identified setup code to be displayed for manual entry into a remote control setup app (with appropriate instructions as needed) or provided via a transmission for use by the remote control setup app. Accordingly, in this example, the OTT device 12*a* will use a first device fingerprint for a set-top box (STB) installed within a home theater environment which includes the OTT device to cause a one a plurality of original equipment manufacturer (OEM) remote control setup code lookup tables to be selected and will use a second fingerprint for the OTT device to identify a setup code within the selected one of the plurality of lookup tables where the identified setup code is to be used, in connection with a remote control setup application, to configure an OEM remote control for the STB to communicate commands to the OTT device. As noted, the identified setup code can be provided to a further device, e.g., a remote server or STB 12a, and the further device can use the provided setup code to identify a codeset with the identified codeset then being provided to the remote control 16 for use by the remote control setup application to configure the remote control 16 to communicate commands to the OTT device.

Figure 5:
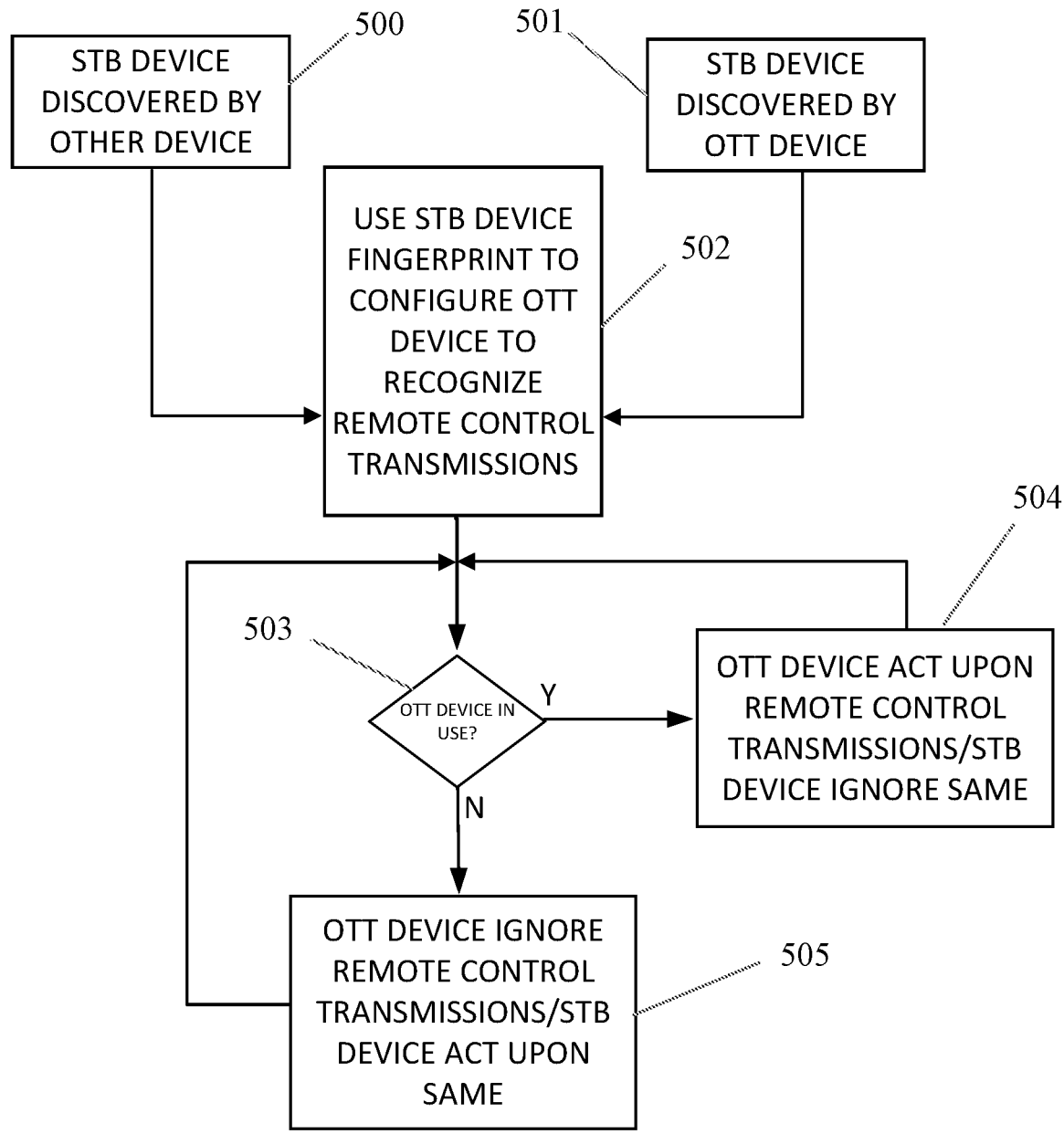
FIG. 5 illustrates example methods for configuring an OTT device to recognize commands from an OEM remote control.

In a further example, illustrated in FIG. 5, a setup agent app installed on a device 12 within the system can use the device fingerprint for the STB 12a (which may include or alternatively include the device fingerprint for the OEM remote control 16) to initiate a configuration of the OTT device 12b (or a bridge device in communication with the OTT device) whereupon the OTT device 12b would recognize commands transmitted from the OEM remote control 16. As discussed previously, the setup agent of the device 12 would receive the device fingerprint information for the STB 12a, and the setup agent of the device 12 can use the fingerprint information for the STB 12a to cause the OTT device 12b to be provided (directly or via a local or remotely located intermediate device in the event the setup agent is not installed on the device 12b in the first instance) with data—such as the STB device fingerprint, a command codeset, and/or the like—as needed by the OTT device 12b for the OTT device 12b to be configured to recognize control commands transmitted from the OEM remote control 16.

In some circumstances, the OTT device 12b can be further configured to ignore commands received from the OEM remote control 16 as a function of the state of the devices 12 within the system. For example, one or more of the STB 12a, OTT device 12b, and the TV 12c can determine that the OTT device 12b is currently being used by the user to watch media on the TV 12c. This state information (obtained, for example, by monitoring the HDMI ports of the relevant devices 12 or the like) can be used by the OTT device 12b to configure itself such that the OTT device 12b will act upon one or more select commands transmitted by the OEM remote control 16. Similarly, this state information can also be provided to the STB 12a and used by the STB 12a to configure itself such that the STB 12a will not act upon the same one or more select commands transmitted by the OEM remote control 16. Similarly, when one or more of the STB 12a, OTT device 12b, and the TV 12c determine that the STB device 12a is currently being used by the user to watch media on the TV 12c. This state information can again be used by the OTT device 12b to configure itself such that the OTT device 12b will not act upon the same one or more select commands transmitted by the OEM remote control 16 while the STB 12a can use this state information to configure itself such that the STB 12a will act upon the same one or more select commands transmitted by the OEM remote control 16.

As will be appreciated, once the OTT device 12b is configured to recognize commands transmitted from the OEM remote control 16, the OTT device 12b can be used as a bridge device, for example to retransmit received commands using the same or a different protocol to one or more intended devices, as desired.

Figure 6:
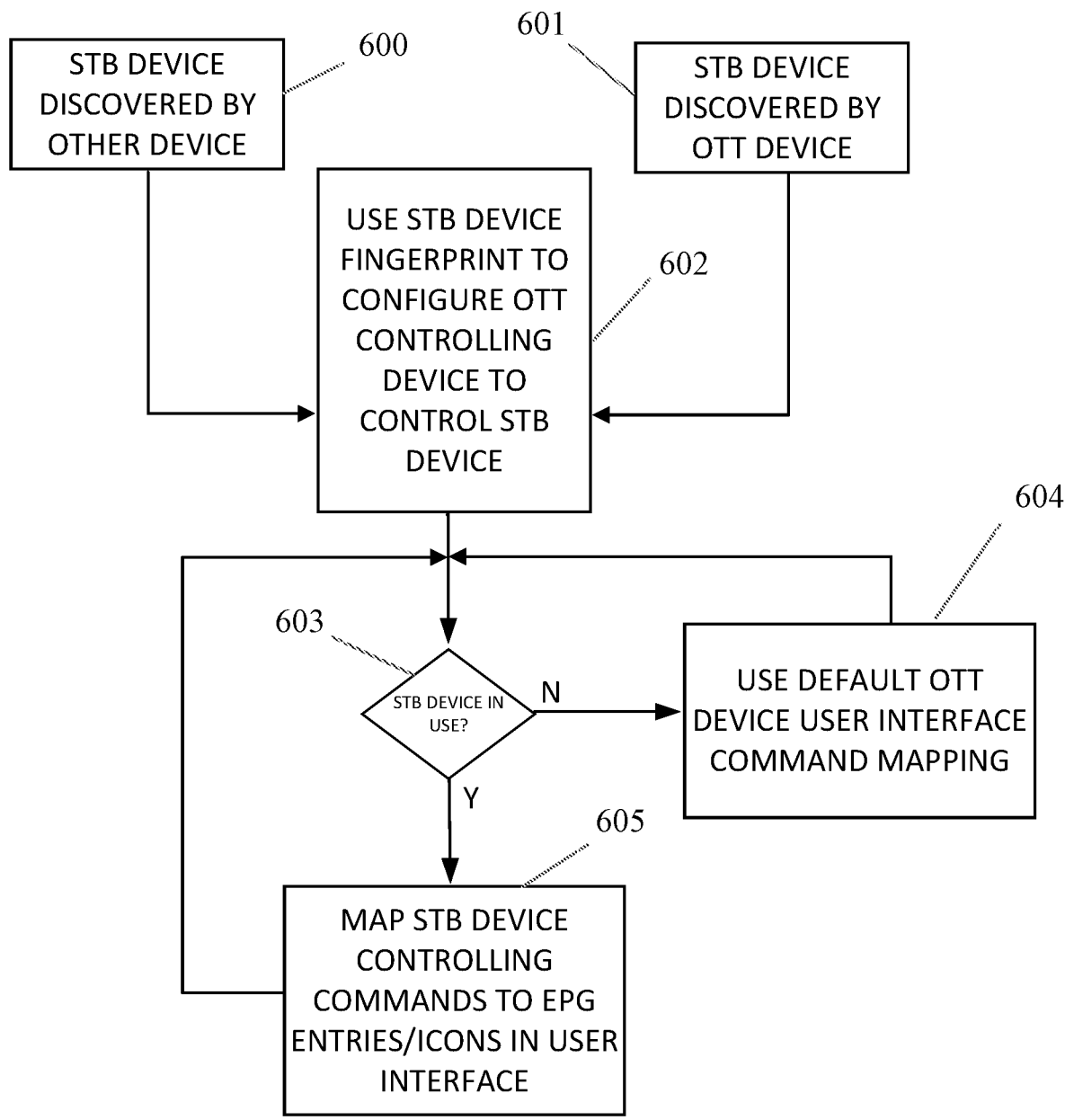
FIG. 6 illustrates example methods for configuring an OTT controlling device to control functional operations of a STB device.

In a still further example, illustrated in FIG. 6, a smart device 18 installed controlling app 20 associated with an OTT device 12b (and/or equally an OEM OTT remote control) is configured to be usable to control functional operations of a STB 12a To this end, a setup app installed on a device 12 within the system 14 will again collect/receive a device fingerprint of the STB 12a and/or OEM STB remote control 16 (collectively and individually the STB device fingerprint). The STB device fingerprint will, as before, be used by a device 12 within the system 14 (and/or a remote server) to configure the controlling app 20 to use commands selected from a command codeset and a communication protocol recognizable by the STB device 12a. In some instances, the STB device fingerprint can also be used to provision the controlling app 20 with a user interface having input elements that are selectable to cause the smart device 18 to transmit commands for controlling functional operations of the STB device 12a. The user interface can, if desired, mimic the look and key layout, in whole or in part, of the OEM STB remote control 16. Similarly, if a pre-existing user interface of the remote control app 20 include a program guide and/or standalone icons representative of content sources (e.g., a television broadcast provider such as "ABC," "ESPN," etc.) and/or media content and the cable service provider provides media from such content sources and/or the same media content, commands for causing the STB device 12a to access such media content and/or the same media content can be mapped to such icons and/or program guide entries whereupon a selection of an entry in the program guide or an icon will cause the transmission of an appropriate command by the smart device 18.

As before, the state of the system can be used by the remote control app 20 to toggle the command to icon/program guide entries mappings. For example, when the system informs the remote control app 20 that the STB device 12a is the active input for the TV 12c. command for use in controlling functional operations of the STB device 12a would be mapped to the one or more icons/program guide entries. However, when the system informs the remote control app 20 that the OTT device 12b is the active input for the TV 12c, the remote control app 20 can revert back to its original command to icon/program guide entries mapping.

While described in the context of a remote control app 20 being configured, it will be appreciated that a bridge device, such as a dongle, the OTT device 12b itself, or the like, can be configured in the same manner to transmit commands to the STB device 12a for accessing media sources and/or media in response to receiving commands from the smart device 18/remote control app 20.

In a still further example, when an OTT device 12b is connected to a display device 12c (e.g. via an HDMI cable, a wireless RF protocol, such as Wi-Fi, BLE, UWB, etc.) and powered on, the programming of the OTT device 12b may cause the OTT device 12b to display instructions on the display device 12c for the user to download an app, e.g., the OTT remote control app 20, to a smart phone 18 for installation. After the app 20 is opened by the user, the app 20 may request permission from the user to allow the OTT device 12a to join the user's home network, for example, by the app displaying a softkey on the smart phone 20 for the user to activate. When the user activates the soft key, the app may receive the smart phone's local area network and authentication information from the memory of the smart phone 18 and communicate that information to the OTT device 12b. The OTT device 12b can then use the information to configure itself for access to the home network and, once so configured, may proceed to automatically join the network.

In a further example, to provide for the easy transfer of data from at least the smart phone 18 to the OTT device 12c, the OTT device 12b may provide an image, such as a QR code, to be shown on the display device 12c. When the user scans the image with the smart phone 18, the OTT app 20 can configure the smart device 18 to directly communicate with the OTT device 12b via one of a plurality of wireless protocols, such as "BLUETOOTH."

Once the OTT device 12b is installed on the user's home network (by whatever means available), the OTT device 12b may scan the user's home network and identify wired/wireless connected devices such as a pay TV operator set top box 12a (e.g. a "CHARTER" or a "COMCAST" set top box) and/or to identify an OEM STB remote control 16. As will be appreciated, the scanning and identifying operation may be equally performed, in whole or in part, via the smart device 18/remote control app 20.

Using the collected device fingerprint information, the remote control app 20 may initiate a provisioning operation for communicating instructions from the remote control app 20 to the STB device 12a. The provisioning may also be initiated from the OTT device 12b, alone or in conjunction with the remote control app 20. In either case, the provisioning operation is complete when the OTT controlling device is able to recognize and communicate with the STB device 12a. In this example, the OTT device 12b may identify the TV operator set top box 12a and communicate the identity information to an internet service associated with the OTT device 12b for the purpose of obtaining from the remote service the information needed to configure the OTT controlling device for use in controlling the STB 12a as per the above.

More particularly, the internet service may perform a data analysis using information stored in an associated database to determine the control codes for the TV operator's set top box 12a and the TV operator's remote control 16 which is associated with the set top box 12a. The internet service may then send the control codes for the TV operator's set top box 12a and the TV operator's remote control's key mapping data to the OTT device 12b. The OTT box 12a may then provides the key mapping data and command code to the OTT app 20 for provisioning the OTT remote control app 20 with the TV operator's remote control 16 commands and command control key mapping.

In a further example, an OTT remote control may be a universal remote control comprising hard and/or soft keys where a provisioning operation to configure the universal remote control may comprise the universal remote control receiving command and protocol information and key mapping data for identically mapping the hard or soft keys to mimic the key mapping of the TV provider's remote control 16 functions and key labels.

In a still further example, a TV 12c having an integrated OTT device scans the system using IP discovery and passive IR scanning. The setup app of the TV 12c, upon discovering the STB 12a, may prompt the user to program the OEM STB remote control 16 during which process the setup app causes the OEM STB remote control 16 to be loaded with the data required to map commands e.g., up, down, left, right key commands, to the internal OTT device.

In a still further example, the OTT remote control is not intended to be configured to directly control the STB 12a. Rather, the OTT remote control may be a fixed-function remote control that transmits a single fixed code per each of its associated keys to the OTT device 12b only. The OTT remote control may use any IR or RF protocol to communicate with the OTT device 12b, where the protocol is not a protocol recognized by the STB 12a. The OTT device 12b is, however, intended to be configured whereupon the OTT device 12b will map the received code from the OTT remote control to the desired function, i.e., the OTT device 12b will be configured into a bridge device for use with the STB 12a. Any change to the mapping is performed by the OTT device 12b and the OTT remote control remains unchanged and continues to transmit the exact same fixed code. As will be appreciated, the OTT device 12b can also be configured to execute a macro command sequence in response to receiving a code from the OTT remote control and each command in a sequence could have been previously defined by use of a smart control app, aa associated skill (such as from the "AMAZON" "ALEXA" set of skills, or the like without limitation and as needed for any particular purpose.

It is to be understood that the various methods disclosed herein can be implemented by hardware, software, firmware, or a combination thereof. It should further be appreciated that the one or more illustrative components may include other components, sub-components, modules, sub-modules, and device commonly found in communication/computing system, which are not discussed herein above for clarity and simplicity of description. Additionally, one or more illustrative components can form a portion of other components and/or one or more illustrative components can be independent from one another.

In addition, while one or more examples have been described, it is understood that these examples are illustrative only, and not restrictive, and that many modifications may become apparent to those of ordinary skill in the art, including that various examples of the inventive methodologies, the inventive systems/platforms, and the inventive devices described herein can be utilized in any combination with each other. Further still, the various steps may be carried out in any desired order, any desired steps may be added, and/or any desired steps may be eliminated.

All patents, patent applications, and other references cited within this document are hereby incorporated by reference in their entirety.

What is claimed is:

1. A method, comprising:
using a first device fingerprint for a device installed within a home theater environment which includes an over-the-top (OTT) device to cause a one of a plurality of original equipment manufacturer (OEM) remote control setup procedures to be selected for use to configure an OEM remote control for the device;
causing the selected one of the plurality of OEM remote control setup procedures to be executed;
providing for use by the executing, selected one of the plurality of OEM remote control setup procedures a second device fingerprint for the OTT device; and
using by the executing, selected one of the plurality of OEM remote control setup procedures the second device fingerprint to cause the OEM remote control for the device to be configured to transmit one or more commands to control functional operations of the OTT device.

2. The method as recited in claim 1, wherein the executing, selected one of the plurality of OEM remote control setup procedures functions to invoke a setup procedure installed on the OEM remote control for the device and the second device fingerprint is provided directly to the OEM remote control for the device for use by the setup procedure installed on the OEM remote control for the device whereupon the setup procedure installed on the OEM remote control for the device will use the second fingerprint to cause the OEM remote control for the device to be configured to transmit one or more commands to control functional operations of the OTT device.

3. The method as recited in claim 2, further comprising causing the OTT device to use the first device fingerprint to configure itself to use a communications channel and a protocol by which the OTT device can communicate at least the second device fingerprint to the OEM remote control for the device.

4. The method as recited in claim 3, wherein the communications channel comprises one of an infrared red (IR) and a radio frequency (RF) communications channel.

5. The method as recited in claim 1, wherein the executing, selected one of the plurality of OEM remote control setup procedures functions to invoke a setup procedure installed on the device and the second device fingerprint is provided directly to the device for use by the setup procedure installed on the device whereupon the setup procedure installed on the device will use the second fingerprint to cause the OEM remote control for the device to be configured to transmit one or more commands to control functional operations of the OTT device.

6. The method as recited in claim 5, wherein the instructions further cause the OTT device to use the first device fingerprint to configure itself to use a communications channel and a protocol by which the OTT device can communicate at least the second device fingerprint to the device.

7. The method as recited in claim 6, wherein the communications channel comprises one of an infrared red (IR) and a radio frequency (RF) communications channel.

8. The method as recited in claim 1, wherein the plurality of OEM remote control setup procedures is stored in a memory of the OTT device.

9. The method as recited in claim 1, wherein the plurality of OEM remote control setup procedures is stored in a database associated with a remote server associated with the OTT device.

10. The method as recited in claim 1, wherein the executing, selected one of the plurality of OEM remote control setup procedures will use the second device fingerprint to identify and cause to be provided to the OEM remote control for the device for use by a setup procedure installed on the OEM remote control for the device data indicative of one or more commands and a communications protocol recognizable by the OTT device whereupon the setup procedure installed on the OEM remote control for the device will use the provided data to cause the OEM remote control for the device to be configured to transmit one or more commands to control functional operations of the OTT device.

11. The method as recited in claim 10, wherein the selected one of the plurality of OEM remote control setup procedures is executed at the OTT device.

12. The method as recited in claim 10, wherein the selected one of the plurality of OEM remote control setup procedures is executed in part at a cloud server device in communication with the OTT device.

13. The method as recited in claim 1, wherein the executing, selected one of the plurality of OEM remote control setup procedures will use the second device fingerprint to identify and cause to be provided to the OEM remote control for the device for use by a setup procedure installed on the STB data indicative of one or more commands and a communications protocol recognizable by the OTT device whereupon the setup procedure installed on the STB will use the provided data to cause the OEM remote control for the device to be configured to transmit one or more commands to control functional operations of the OTT device.

14. The method as recited in claim 13, wherein the selected one of the plurality of OEM remote control setup procedures is executed at the OTT device.

15. The method as recited in claim 10, wherein the selected one of the plurality of OEM remote control setup procedures is executed in part at a cloud server device in communication with the OTT device.

16. The method as recited in claim 1, wherein the first device fingerprint is obtained from the device.

17. The method as recited in claim 1, wherein the first device fingerprint is obtained from the OEM remote control for the device.

18. The method as recited in claim 1, wherein the first device fingerprint identifies at least a brand for the device.

19. The method as recited in claim 1, wherein the device comprises a set-top box device.

20. A method, comprising:
using a first device fingerprint for a device installed within a home theater environment which includes an over-the-top (OTT) device to cause a one of a plurality of original equipment manufacturer (OEM) remote control setup code lookup tables to be selected for use to configure an OEM remote control for the device;
using a second device fingerprint for the OTT device to identify a setup code within the selected one of the plurality of OEM remote control setup code lookup tables; and
using the identified setup code by a setup procedure to configure the OEM remote control for the device to transmit one or more commands to control functional operations of the OTT device.

21. The method as recited in claim 20, wherein the setup procedure is executed at least in part on the device.

22. The method as recited in claim 20, wherein the setup procedure is executed at least in part on the OEM remote control for the device.

23. The method as recited in claim 20, wherein the device comprises a set-top box (STB) device.

* * * * *